Dec. 7, 1926.　　　　　　　　　　　　　　　　1,610,101
M. LIND ET AL
TOY VEHICLE
Filed June 28, 1926　　　3 Sheets-Sheet 1
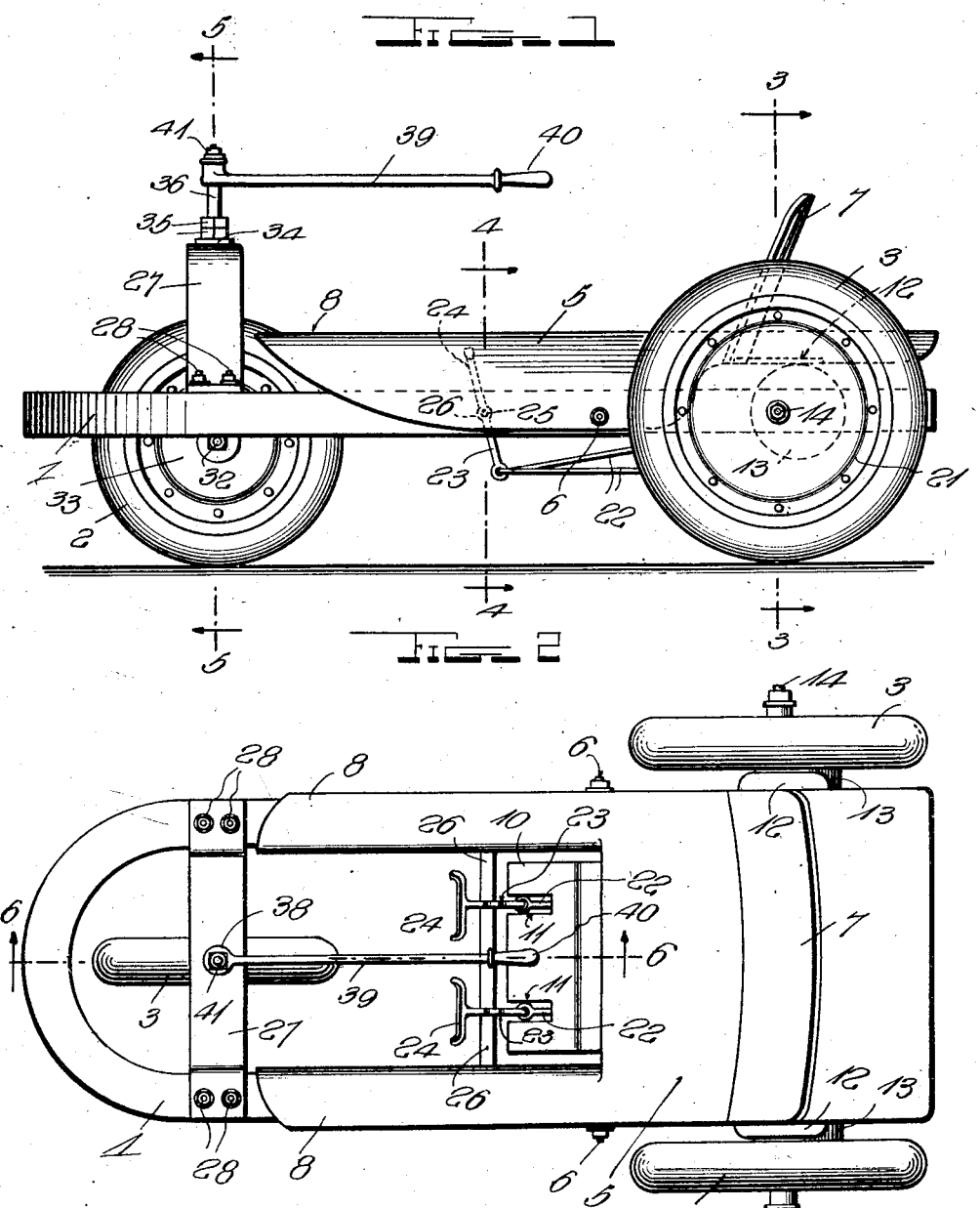
Inventors
Mathilde Lind,
Werner C. Lind,
ATTORNEYS.

Dec. 7, 1926.  1,610,101
M. LIND ET AL
TOY VEHICLE
Filed June 28, 1926   3 Sheets-Sheet 2

Inventors
Mathilde Lind,
Werner C. Lind,
BY
James J. Sheehy
ATTORNEYS.

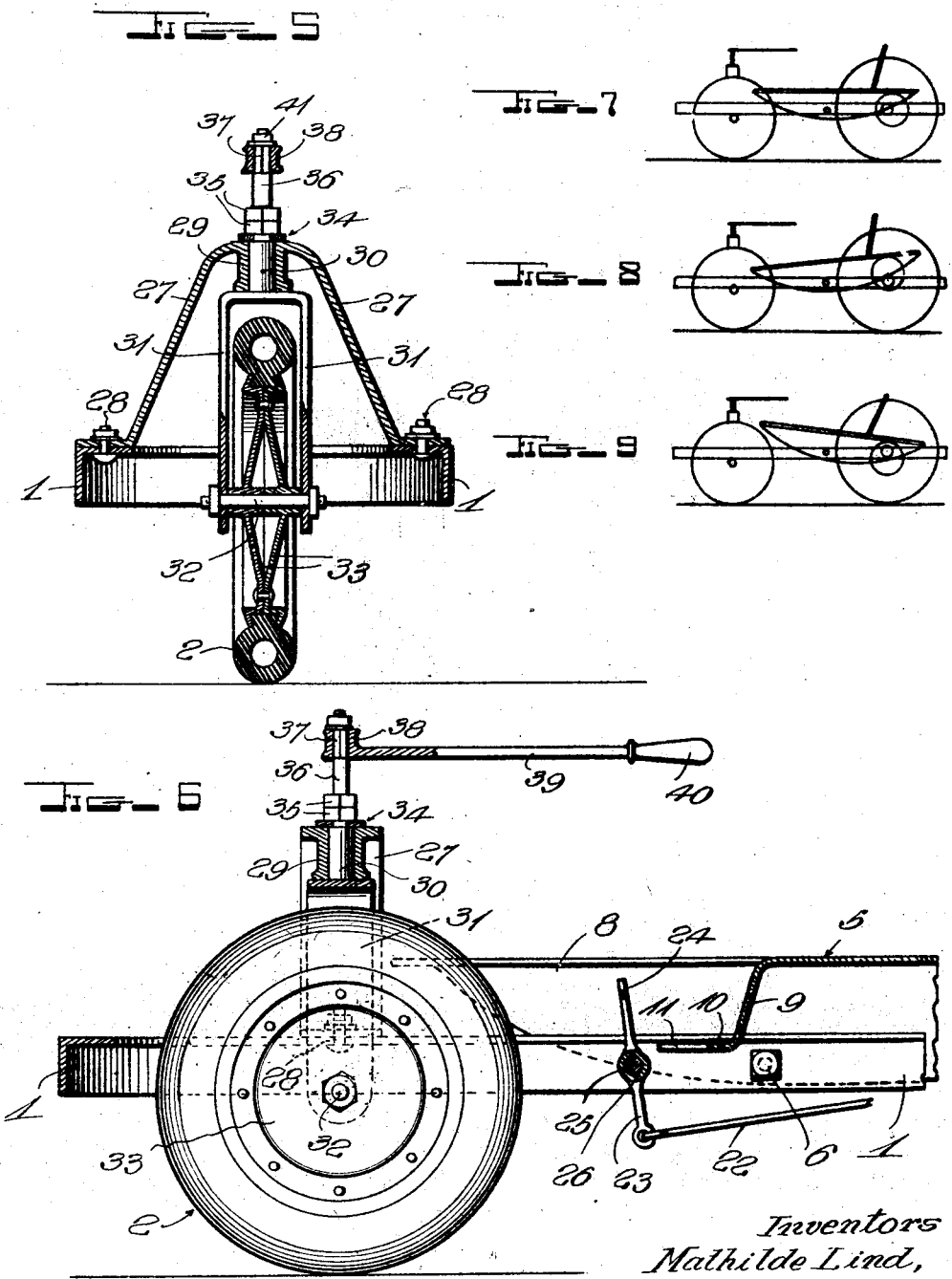

Patented Dec. 7, 1926.

1,610,101

UNITED STATES PATENT OFFICE.

MATHILDE LIND AND WERNER C. LIND, OF NEW ORLEANS, LOUISIANA.

TOY VEHICLE.

Application filed June 28, 1926. Serial No. 119,099.

Our present invention pertains to self propelling vehicles and it contemplates the provision of a simple and inexpensive device of the character set forth that is adapted for use by a child for propelling the child from place to place.

The invention further contemplates the provision of a device of the character designated that may be self propelled by the occupant of the vehicle or may be pushed or pulled by a person other than the occupant and further the device is adapted to have a rocking motion imparted thereto either when the vehicle is stationary or being propelled or otherwise moved.

Other objects of the invention will be fully understood from the following description and claims when the same are read in connection with the drawings accompanying and forming part of this specification, in which—

Figure 1 is a side elevation of our invention.

Figure 2 is a plan view thereof.

Figure 5 is a sectional view taken in the plane indicated by the line 5—5 of Figure 1.

Figure 6 is a transverse vertical section taken in the plane indicated by the line 6—6 of Figure 2.

Figures 7, 8 and 9 are diagrammatical views illustrating the manner in which the body of the vehicle is positioned in various angles during the rocking motion of the body with respect to the frame of the vehicle.

Similar numerals designate corresponding parts in all the views of the drawings.

Figure 3:
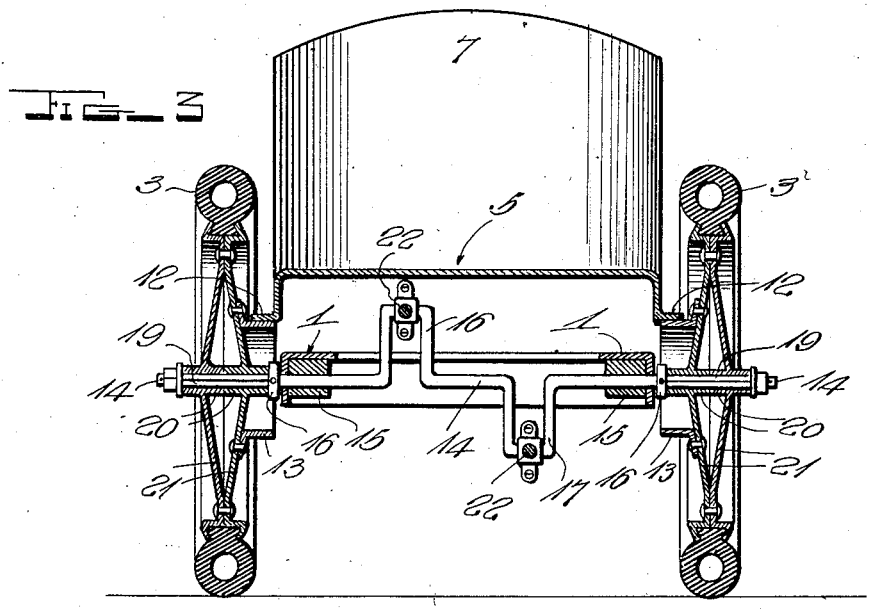
Figure 3 is a transverse sectional view taken in the plane indicated by the lines 3—3 of Figure 1.
Figure 4:
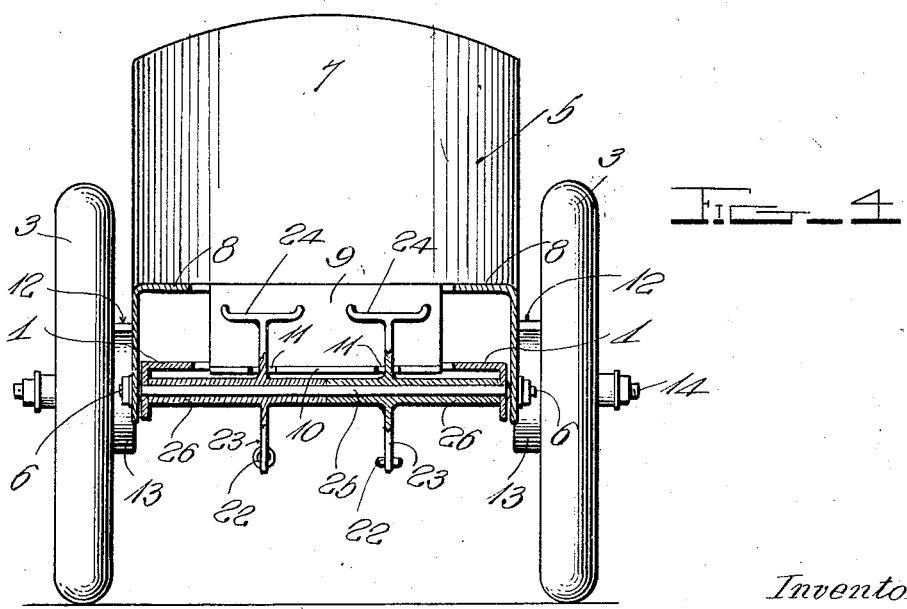
Figure 4 is a similar view taken in the plane indicated by the lines 4—4 of Figure 1.

Our novel vehicle comprises the angular frame 1 of wood or other suitable material and may be iron if desired, and mounted on the forward end of the vehicle is a front steering wheel 2 while on the rear of the vehicle we provide driving wheels 3 and mounted on the frame 1 is the seat proper 5 and this seat is pivoted at 6 and in such a manner that the seat and the equipment integral thereto is adapted to be rocked with respect to the frame when the vehicle is in motion or stationary. The seat is provided with the back rest 7 and terminates in the forward ends 8. It will be seen that the seat portion is cut away in the center leaving only the front portions 8 that stradde the frame 1. The material forming the seat is bent as indicated at 9 in a downward direction and then bent forwardly as at 10 and in this forward portion 10 we provide slots 11 for a purpose hereinafter set forth.

The material forming seat of the vehicle is further provided with the lateral plates 12 whereby they engage cams 13 that are provided on the rear wheels. These cams are journalled in the spindles 14 that in turn pass through the bearings 15 and the said spindles are provided with the cranks 16 and 17 and pass through the hubs 20 previous to passage through the collars 18. The spindles at the points 19 where they pass through the hubs are squared. The said hubs terminate in the disk wheels 21 and the said wheels may be rubber cushioned or otherwise in the discretion of the manufacturer.

Secured to and adapted to impart rotary motion to the cranks 16 and 17 are pitmen 22 that extend to the treadles 23 that are provided with the pedals 24.

Adapted to receive the treadles 23 is a rod 25 and surrounding this rod is a sleeves 26. The sleeves and treadles are preferably formed integral and the rod passes through the sleeve and through the treadle and therefore movement of the treadles will cause the sleeve to travel around the rod to the limit of movement of the treadles.

The forward end of the frame is provided with an upstanding support 27 that is bolted to the frame at 29 and adapted to pass through the supports 27 and rotate independent thereof is a hub 29 that accommodates the member 30 and secured to this member 30 and movable therewith is the bracket 31 that engages the rod 32 while mounted on this rod and rotatable independent thereof is the disk portion 33 of the front wheel 2. The washer 34 is positioned on the upper end of the support 27 and the nuts 35 are threaded on the upper end of the hub 29 as illustrated. This hub 29 is provided with the extension 36 having the squared portion 37 to accommodate the hub 38 of a rod 39 having the handle 40 for the purpose of steering the vehicle by the occupant. The steering means is fastened on the squared portion 37 by means of the nut 41.

In the use of the device the child or occupant by exerting pressure on the pedals 24 will rotate the cams 13 and this will cause movement of the vehicle. It will also impart rocking movement to the body as clearly illustrated in Figures 7, 8 and 9. The device may be either steered by hand or foot of the occupant or the handle may be turned forwardly and the vehicle pulled by other than the occupant if desired and by the same token the vehicle may be pushed by a person thereby eliminating any effort on the part of the occupant of the vehicle toward propelling the device.

What we claim:

1. A device of the character set forth comprising a frame, a body journalled on the frame, a shaft mounted in the frame and having crank arms formed therein, pitmen secured to the crank arms, wheels mounted on the shaft, cams formed on the wheels and adapted to bear against a portion of the body whereby rocking movement is imparted to the body on rotation of the shaft, a support mounted on the forward end of the frame and a wheel journalled in the support and means mounted on the support for steering the device.

2. In a vehicle the combination of a frame, a shaft journalled in the frame, wheels secured to the shaft, cams formed in the wheels, pitmen secured to the shaft, treadles secured to the pitmen for actuating them, a shaft arranged in the frame, casings formed integral on the treadles and surrounding said shaft, a body movably mounted on the frame and rockable by the cams during movement of the vehicle and adapted for rocking movement when the vehicle is stationary and means formed on the forward end of the frame for steering the vehicle.

3. A vehicle comprising a frame, a body forming a seat and guard mounted in swinging manner on the frame, a cam shaft journalled in the frame, traction wheels arranged on the shaft, cams formed on the wheels whereby rotary motion of the wheels will rotate the cams; said cams being adapted to contact the body to impart rocking motion thereto, means for actuating the cam shaft and means mounted on the forward end of the vehicle for steering the same.

In testimony whereof we have hereunto set our hands.

MATHILDE LIND.
WERNER C. LIND.